United States Patent Office 3,477,871
Patented Nov. 11, 1969

3,477,871
PROCESS FOR COATING PAPER WITH A STARCH-VINYL ESTER TERPOLYMER LATEX BINDER
William J. van Westrenen, Delft, Netherlands, assignor to Shell Oil Company, New York, N.Y., a corporation of Delaware
No Drawing. Filed Oct. 6, 1966, Ser. No. 584,670
Claims priority, application Netherlands, Oct. 26, 1965, 6513811
Int. Cl. D21h 1/22, 1/28, 1/34
U.S. Cl. 117—155                        5 Claims

ABSTRACT OF THE DISCLOSURE

Paper which is coated with an aqueous dispersion comprising a filler (clay) and a vinyl binder polymer prepared by copolymerizing vinyl esters of alpha-branched, saturated, aliphatic monocarboxylic acids with vinyl acetate, and optionally an ethylenically unsaturated acid (acrylic acid) exhibit improved water resistance, gloss and printability.

---

This invention relates to a process for coating paper. More particularly this invention provides coated papers which exhibit excellent water resistance, very good gloss and improved printability.

Specifically, the invention provides a process for coating paper which comprises applying to said paper an aqueous dispersion comprising a filler and a vinyl binder polymer prepared by a process which comprises copolymerizing vinyl esters of alpha-branched, saturated, aliphatic monocarboxylic acids with another copolymerizable ethylenically unsaturated compound, such as vinyl acetate.

Processes for coating paper are well-known in the technique of paper manufacture wherein a filler and a binder are applied to the paper in an aqueous dispersion. The binder is generally casein or starch although styrene-butadiene copolymers, butadiene-methyl methacrylate copolymers or acrylate-vinyl acetate copolymers are sometimes additionally employed. The filler used is normally a pigment such as clay to give the paper increased whiteness. In general, clays are the most important pigments in use in the paper industry since they are relatively inexpensive, available in large quantities and possess the property of being rapidly dispersible.

The majority of paper coatings today are prepared using casein and/or starch binders and clay fillers. Although these coatings are suitable for many uses, there is still a need to provide papers which have improved water resistance, improved gloss, and improved printability.

It has now been found quite unexpectedly that when the papers are coated by conventional techniques wherein the binder is a vinyl polymer of an alpha-branched, saturated, aliphatic monocarboxylic acid and certain ethylenically unsaturated compounds, the papers exhibit improved properties such as excellent water resistance, improved gloss and improved printability. Improved results and properties are also achieved when these vinyl polymers are used in combination with the conventional binders such as starch and casein.

It is therefore the primary object of the present invention to provide coated papers having improved physical-properties. It is another object to provide a process for coating paper and paper products.

These and other objects will become obvious to one skilled in paper manufacturing from the following disclosure.

Paper coating is an important part of the paper industry. It is a wide field which includes the application of many different types of coatings to the base paper. The present process may be utilized in any process in which paper is pigment coated wherein an aqueous mixture of pigment and adhesive (binder) is applied to the surface of paper. Therefore, the essential novelty of the present process is the use of a particular adhesive or binder in otherwise well-known paper coating processes.

Since pigment coating techniques of paper are well known to those skilled in the paper manufacturing art, no attempt will be made to describe in any detail the various processes. The artisan is directed to well-known textbooks such as "Pulp and Paper Chemistry and Chemical Technology," James P. Caseg, second edition, Interscience Publishers, Inc., three volumes 1961, particularly chapter XIX; and "Pulp and Paper Science and Technology," C. Earl Libby, McGraw-Hill Book Company, two volumes, 1962, particularly chapter 12, among many others.

Briefly, however, most pigment-coated papers are used in printing; therefore, the demand for better printing surfaces is a constant burden to the paper coating fields.

Of course, there are three basic raw materials used in pigment coating: (1) the pigment, (2) the adhesive used for bonding the pigment, and (3) the base paper, or raw stock, to which the pigment is bonded.

The coating mixture is usually prepared by dispersing the pigment and adhesive separately in water and then mixing the two together. After the coating mixture has been prepared, it must be applied to the paper in the coating process, which generally consists of applying the fluid coating mixture to the base paper, smoothing, drying and calendering the coating. While all these steps are important in order to obtain a satisfactory coating, their control forms no part of the instant process.

The present process may employ off-machine or machine coating techniques. Off-machine coating is carried out as a separate operation in a coating plant, whereas machine coating is carried out on the paper machine as an integral part of the papermaking operation. Although machine coating techniques are growing in popularity, there are still circumstances under which it is more feasible to coat by the off-machine method. In general, the paper is coated and dried at normal paper machine speeds using either the wet-end coating or size press coating techniques.

There are at least ten basic methods of coating including dip, knife, cast, roll, brush, air brush, spray, print, extrude and strip. While all these methods are not in general use for pigmented coatings, any one of these methods may be employed in the present process.

The most important processes include brush coaters (exclusively for off-machine coating); smoothing roll coaters; roll coaters, including the planographic roll coater and the rotogravure roll coater; knife coaters, including the Champion knife coater, trailing blade coater, the Champflex coater, and the Kohler coater; and air-knife coaters.

A very suitable coater for use in the present process is the air-knife coater wherein an excess of coating is applied to the paper by roll applicator and the excess coating is thus blown off the sheet by means of a thin air jet which strikes the wet coating at an angle where the sheet is wrapped around a breast roll.

In general, any pigment which has the physical and chemical properties which are necessary for paper coating may be employed in the present process. A good pigment should possess all or most of the following properties: good dispersibility in water, correct particles size distribution, high opacifying power, high brightness, low water absorption, nonabrasive qualities, chemical inertness, compatibility with other ingredients of coating mixture, low adhesive demand, and, if colored, a high tinctorial power and color permanence.

Although clay accounts for over 90% of the pigments used, and is preferred, other suitable pigments include, among others, titanium dioxide, precipitated calcium carbonate, water-ground calcium carbonate, calcium sulfate, calcium sulfite, barium sulfate, satin white, zinc pigment, diatomaceous silica, and color pigments such as chrome yellows, Umbers, cobalt green, Malachite green, sienna, red lead, lampblack, etc.

The binder (herinafter sometimes called latex) which is utilized in the present process is a polymer preferably prepared by copolymerizing vinyl esters of alpha-branched, saturated, aliphatic monocarboxylic acids with another copolymerizable ethylenically unsaturated compound, preferably vinyl acetate. In addition, this copolymer latex may contain a small amount of an $\alpha,\beta$-ethylenically unsaturated carboxylic acid such as methacrylic acid, acrylic acid, crotonic acid, itaconic acid, and the like, and is preferably acrylic acid. In general, less than 5% acrylic acid is employed, and preferably from 1 to 3% is employed. The presence in the copolymer latex of 1 to 3% acrylic acid results in an increased freezing-thawing stability of the latex, so that the latex can be kept for a longer period of time under extreme conditions.

For the sake of brevity, the saturated, aliphatic monocarboxylic acids whose carboxyl group is attached to a tertiary or quaternary carbon atom will usually, in this specification, be referred to as branched or alpha-branched monocarboxylic acids.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art ("Carbonsaure—Synthese aus Olefin, Kohlenoxyd und Wasser," Koch, Brennstoff-Chemie, November 1955, pages 321–328). Monocarboxylic acids branched at the alpha position can also be obtained according to Reppe's method. Of special value are the acids from mono-olefins with 8 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

In general, preferred alpha-branched saturated aliphatic monocarboxylic acids may be represented by the general formula

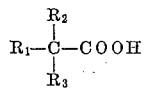

wherein $R_2$ and $R_3$ are alike or unlike and are each an alkyl group; $R_1$ is a hydrogen atom or an alkyl group, said monocarboxylic acids contain at least 9 carbon atoms in the molecule. Preferred acids contain from 9 to 19 carbon atoms ($R_1+R_2+R_3=7$ to 17 carbon atoms) and very preferred acids contain from 9 to 11 carbon atoms ($R_1+R_2+R_3=7$ to 9 carbon atoms) and 15 to 19 carbon atoms ($R_1+R_2+R_3=13$ to 17 carbon atoms).

The vinyl esters of the said monocarboxylic acids branched at the alpha position may be prepared from the acids by known techniques, for instance, by reaction of the acid mixture with vinyl acetate in the presence of a mercury salt, or by reaction of the acids with acetylene in the presence of zinc, cadmium or mercury compounds.

The vinyl esters of monocarboxylic acids branched at the alpha position are preferably copolymerized with other copolymerizable ethylenically unsaturated compounds, containing on either side of the double bond or bonds up to about 8 carbon atoms. Examples of such compounds are vinyl acetate; vinyl esters of other carboxylic acids, such as pivalic acid; vinyl chloride; vinylidene chloride; acrylonitrile; esters of unsaturated carboxylic acids, such as methyl acrylate, ethyl methacrylate, diethyl maleate and dibutyl fumarate; and unsaturated hydrocarbons, such as ethylene, propylene, styrene; alkyl substituted styrenes; conjugated dienes such as butadiene, isoprene, and the like.

The ratio of vinyl esters of alpha-branched acids to the other copolymerizable ethylenically unsaturated compound, which is preferably vinyl acetate, may vary widely. In general, however, the copolymer will contain from about 10 to 80% by weight of the vinyl esters of alpha-branched acids and from about 20 to 90% by weight of the other copolymerizable ethylenically unsaturated compound, i.e., vinyl acetate. Preferred latex polymers contain from about 20% to 65% vinyl acetate, from 35 to 80% by weight of alpha-branched, saturated, aliphatic monocarboxylic acids containing from 9 to 19 carbon atoms in the acid portion, and preferably 9 to 11 carbon atoms, and, optionally, from 1 to 3% by weight of acrylic acid.

The coplymer latex may be prepared by known techniques described in U.S. 3,186,974 by Verberg; copending U.S. patent application Ser. No. 251,767, filed Jan. 16, 1963, by Grommers and Vegter, now U.S. 3,294,727, issued Dec. 27, 1966; copending U.S. patent application Ser. No. 350,528 filed Mar. 9, 1964, by Grommers and Vegter, now U.S. 3,370,031, issued Feb. 20, 1968; and U.S. patent application Ser. No. 393,771, filed Sept. 1, 1964, by Grommers and Vegter and now abandoned.

Briefly, the polymerization may be effected according to known techniques, both with and without diluents. When using diluents one can distinguish between polymerization in solution and polymerization in aqueous dispersion.

According to the latter method emulsifiers and/or protective colloids are as a rule used, stirring being applied as desired.

The copolymerization is initiated and/or catalyzed by conventional means. As a rule substances supplying free radicals are added, such as peroxides, for instance benzoyl peroxide and ditertiary butyl peroxides and other peroxy compounds, such as potassium persulphate and hydrogen peroxide, and diazo compounds, such as alpha-alpha'-azoisobutyronitrile. Often also redox systems are used. The temperatures usually vary between 30° and 150° C., particularly between 50° and 90° C. Polymerization may also be promoted by irradiation, particulary with ultraviolet light.

The latex binder may be advantageously employed in combination with casein and/or starch.

In general, the latex/casein weight ratio in the total binder may vary within wide limits. Preferable latex/casein weight ratios are between 20:80 and 90:10. A very suitable ratio was found to be between 50:50 and 75:25. The latex/starch ratios are the same as latex/casein.

The pigment to binder weight ratio will vary widely depending, of course, upon many factors, especially the coating means employed; however, the pigment:binder weight ratio will usually be between 100:30 and 100:10. Very suitable pigment:binder weight ratios are between 100:20 and 100:10.

Other additives may be employed as desired, including, among others, dispersants, solubilizers, buffers, thixotropic agents, viscosity stabilizers, eveners, antifoaming agents, plasticizers, softening agents, dyestuffs, soaps, waxes, oils and wetting agents.

Suitable solubilizers include sodium hydroxide, ammonium hydroxide, borax and trisodium phosphate. The use of ammonium hydroxide has the advantage of reducing the alkalinity of the paper, which is often desirable when the paper is used for printing.

Common fluidifiers are urea and dicyandiamide.

Rheologic and thixtropic agents include the amines such as diethylenetriamine and soaps such as sodium and ammonium stearates and metallic soaps.

Softening agents or plasticizers include invert sugar, sorbitol, urea, glycerine and corn syrups as well as resin latices, ethanolamine soaps, alkyd resins, fatty acid esters, soaps and polyglycols.

The percent solids in the final coating dispersion may vary quite widely depending upon many factors such as coating technique, machine speeds and paper end uses. It is customary in coating technology to arbitrarily divide coatings into high-solids coating mixtures and low-solids coating mixtures. It will be appreciated that these terms are quite flexible, but in general, cover the range of 30 to 50% solids for low-solids coating mixtures and 50 to 70% solids for high-solids coating mixtures. The present process, therefore, preferably utilizes a solids content between about 20 and 75% by weight and preferably between about 35 and 60% by weight of solid.

In general, any raw paper stock which is customarily used or which can be effectively coated can be employed in the present process. No discussion is believed necessary herein relevant to the raw stock which may be employed except to note that most raw stock is made from lightly beaten, weakly sized stock which may be obtained by any conventional pulp process such as the sulfite, soda or sulfate processes. A typical coating raw stock is as follows: 25 to 50% supporting fibers, 40 to 70% filler fibers, 5 to 15% filler pigment, 1 to 10% sizing and other ingredients and 40 to 60% air.

The coat weight applied to the base paper in the coating operation is primarily determined by the percent solids in the coating mixture but will generally range from about 0.0001 to 0.001 inch. A typical film thickness of a wet coating is from about 0.0014 to 0.0017 inch for a book paper coated with 25 pounds of coating per ream (25 x 38—500) on two sides, using a coating mixture between 35 and 40% dry solids.

After the coating has been applied to the paper, the coating may be smoothed or leveled, dried and then calendered and/or cut to size by well-known techniques.

The invention is illustrated by the following examples. The reactants and components, their proportions and other specific ingredients of the formulations are presented as being preferred and typical and various modifications can be made in view of the foregoing disclosure without departing from the spirit or scope of the disclosure or of the claims. Unless otherwise specified, parts and percentages are by weight.

The air knife coating technique was employed in all of the following examples wherein 30 x 35 cm. bleached kraft papers of about 85 g./m.$^2$, machine glazed (smoothed commercially) on one side were fixed to a horizontal table. The coating mixture was then poured onto the sheet after which the table was allowed to move at a speed of 8.5 m./min. under an air jet. The excess of coating was then blown off the sheet by this thin air jet (width—28 cm.) which struck the coating at a certain angle.

After conditioning the coated papers at 20° C. and 65% relative humidity, the following tests were carried out:

*Weight of coating.*—The weight of the dry coating was determined by weighing a specially cut piece of 1 d$_m^2$ and subtracting from this weight the weight of an uncoated piece. In general, an average of three or more separate measurements was determined.

*Printing penetration.*—A drop of dibutylphthalate colored with Sudan red is spotted on a disc of an I.G.T. Printability Tester (developed by Research Institute for Printing and Allied Industries, TNO, Holland). A print on a strip of the coated paper to be tested is immediately made with falling pendulum and the drop is squeezed out to an eliptically shaped blot. Smooth, well-closed paper shows a long, drawn spot; rough, porous papers, a short one. The volume of the drop was kept constant with the aid of a syringe.

Printing pressure and viscosity have relatively less, and the printing velocity and surface porosity, on the contrary, more influence on the spot length. The penetration is inversely proportional to the spot length. As a measure of a degree of penetration, it is customary to quote the reciprocal of the spot length as 1000/spot length in millimeters. This volume was determined as an average of at least 10 separate measurements.

*Dennison pick resistance.*—The pick resistance of coated paper is its ability to resist lifting of the coating away from the surface of the papers during printing, which is usually due to the tack of certain inks.

The pick resistance or pick strength was determined using the Dennison Standard Waxes, a series of waxes having graduated adhesiveness increasing from 2 to 20. To carry out the test, the end of the wax stick is softened over an alcohol lamp and then pressed against the paper. After 15 minutes cooling, the stick is pulled vertically from the paper. The lowest numbered wax that picks gives its value. This test, of course, is only used as a rough indication and is generally carried out on at least 5 different places on the paper sample.

Density of print (bookprinting offset).—For both bookprinting and offset, a print is made with a special black ink developed for use with the I.G.T. Printability Tester. For bookprinting an aluminum printing form is used and for offset, a rubber covered printing form is used. The sector of the Printability Tester to which the test strips are attached is turned by hand.

After 24 hours of dying, the test strips were compared to assess visually the degree of blackness.

I.G.T. pick resistance.—On the shaft of the I.G.T. Printability Tester, a pendulum with weight was affixed, which is released from a certain position. The pendulum then falls under the influence of gravity, the peripheral velocity of the sector increasing to about 230 ft./min. This velocity is generally sufficient for certain experiments; however, a spring drive device was fixed to the tester enabling a maximum velocity of about 450 ft./min. (A), of about 560 ft./min. (M) or of about 650 ft./min. (B) to be reached.

The greater the printing speed, the sooner picking occurs. Highly pick resistant paper, therefore, only picks at high printing speeds. Consequently, the distance between the bottom of the test strip and the point where picking is observed expresses a certain degree of pick resistance. The pick resistance determine with the aid of the I.G.T. tester gives a more reliable indication than obtainable with the Dennison standard waxes. The data were obtained as an average of at least 6 separate measurements.

Striking-in.—This test is carried out using the I.G.T. tester by making a print of a black, light viscous ink on the test paper, by turning the pendulum by hand. Immediately after the print is made, the printed test strip on the sector is covered with a strip of good art printing paper. One-third of the sector, with both strips, is allowed to descend, in touch with the printing form, 5 seconds after the first print is made. The second third of the sector is released after 30 seconds and the last third, after 60 seconds. Slight striking-in is associated with transference of a large quantity of link to the art paper. More rapid striking-in is characteristic by transference of less ink. The rapidity of striking-in is determined on the basis of density of the ink transferred to each part of the art paper strip.

After 24 hours the density of the ink transferred to the art paper was given a numerical rating, representing the visually assessed order.

Wet rub resistance.—This test is well known in paper coating industries wherein a piece of test paper of an appropriate size is brought in contact with water for 15 seconds. This is done by keeping the paper with the coated side downwards on the water surface. Subsequently, the paper is removed from the water and after 15 seconds the coated side is rubbed with the thumb. The thumb is then rubbed onto a sheet of black paper. Any pigment loosened by the water can easily be seen on the black surface after it has dried. The intensity of the deposit of color depends on the water resistance of the coating and/or the number of rubs. The higher the numerical rating (0–10) the better the wet rub resistance.

The results of all tests performed are expressed numerically in a rating from 0 to 10 (poor to excellent) in the tabulated data.

The vinyl esters of alpha-branched, saturated aliphatic monocarboxylic acids used in the examples were prepared from alpha-branched acids containing from 9 to 11 carbon atoms as follows:

A fraction was taken of a product obtained by thermal cracking of a paraffinic base material in the vapor phase in the presence of steam, which fraction consisted for the greater part of alkanes with 8 to 10 carbon atoms. This fraction was partially hydrogenated to convert any dienes present in alkenes. After this hydrogenation the alkenes constituted 76% by weight of the mixture, of which 39% by weight were straight-chain, 20% by weight were branched and 17% by weight were cyclic alkenes, while double bonds at terminal carbons hardly occurred. The balance of the mixture consisted of saturated hydrocarbons (17% wt.) and aromatics (7% wt.).

The olefins were converted into monocarboxylic acids at 60° C. in a reaction mixture while the composition was kept constant. The hydrocarbon mixture containing the olefins was fed at a rate of 0.7 l./h. The catalyst, which consisted of $H_3O_4$, $BF_3$ and $H_2O$ in the molar ratio of 2:3:2, was fed at a rate of 1.4 l./h. The liquid part of the reaction mixture was kept at a volume of 3 liters. The liquid was kept under a carbon monoxide pressure of 70 atmospheres absolute. Vigorous stirring was applied. The apparatus consisted of chrome-nickel steel.

In the reaction mixture leaving the reaction chamber, the two liquid phases were separated. The phase containing the mixed carboxylic acids was washed continuously and countercurrently at 40° C. with 5% by volume of water and subsequently at 20° C. also continuously and countercurrently successively with another 10% by volume of a 1% solution of sodium citrate in water and with 10% by volume of a 5% solution of sodium bicarbonate in water.

The mixed monocarboxylic acids were extracted from it continuously with excess ammonia in water. From the solution of the ammonium salts the free and bound ammonia was evaporated continuously. The mixed monocarboxylic acids separated as a liquid, and were subsequently dried and distilled in vacuo.

These mixed alpha-branched monocarboxylic acids were then converted in the vapor phase with acetylene into the vinyl esters in the presence of a catalyst consisting of 24% cadmium silicate on pumice.

Dry acetylene was passed at a rate of 60 l./h. through a vessel in which the said monocarboxylic acids were kept at 200° C. The mixture of acetylene and vapor of the monocarboxylic acids was passed through a quartz tube with a diameter of 25 mm., which was kept in an electric furnace at 300–330° C. This tube was 45 cm. long and was filled with 150 ml. of said catalyst. The vapors leaving the tube were condensed. The condensate, which contained vinyl esters and also non-converted monocarboxylic acids, was distilled in vacuo.

The vinyl esters (70% m.) were distilled at a pressure of 0.5 mm. Hg. at 45–65° C. To remove traces of monocarboxylic acids, the vinyl esters were washed with dilute caustic soda and with water.

These vinyl esters were then copolymerized with vinyl acetate in emulsion in the weight ratios of vinyl acetate: vinyl esters of alpha-branched monocarboxylic acids of 50:50; 60:40 and 65:35.

The copolymerizations were performed in the same manner in a flask with a stirrer, reflux condenser and thermometer.

1.15 g. of polyvinyl alcohol (prepared by almost complete saponification of polyvinyl acetate), 0.38 g. of sodium dodecylbenzene sulphonate (prepared by alkylation of benzene with propene tetramer, followed by sulphonation, 0.25 g. of potassium persulfate and 0.13 g. of sodium bicarbonate were dissolved in 48 g. of water. Then 50 g. of a mixture consisting of vinyl acetate and the vinyl esters obtained as disclosed above was added with stirring in the said weight ratios. The air was displaced by nitrogen, and the flask was heated with stirring to 70° C. During the exothermal copolymerization the temperature was kept for 2 hours at 70° C., and then for one-half hour at 80° C. The suspensions of the copolymers were cooled with stirring to room temperature and filtered through cotton wool to remove some coarser particles of copolymer. The concentration of the copolymers in these suspensions was 50% w. At room temperature these suspensions could be kept for a considerable time.

These resulting vinyl acetate- vinyl esters of alpha-branched monocarboxylic acids containing 9–11 carbon atoms in the acid portion of the molecule will be referred to hereinafter and in the examples for convenience as follows:

Vinyl acetate: vinyl esters of alpha-branched saturated monocarboxylic acids contained 9–11 carbon atoms (wt. ratio):

| | Latex designation |
|---|---|
| 50:50 | Vinyl Latex A |
| 60:40 | Vinyl Latex B |
| 65:35 | Vinyl Latex C |

EXAMPLE I

A paper coating composition was prepared from the following formulation in parts by weight (p.b.w.):

Pigment:
    China Clay S.P.S. _____ 100
    Calgon "S" (dispersing agent) _____ 0.3
    Water _____ 100
Binder:
    Farinex TSC (Starch, converted) _____ 12
    Water _____ 65
    Vinyl Latex A, 50% wt. _____ 15

The pigment dispersion was made by stirring for about two hours in a slow paddle mixer a slurry of clay in water to which a small amount of wetting agent had been added.

The starch solution was made as a 20% wt. solution by cooking the starch, while stirring, with the required amount of water until a temperature of 90° C. had been reacted. The solution was kept at this temperature for about 10 minutes, after which it was applied by adding it to the pigment dispersion. At the end Vinyl Latex A was added and the total mixture stirred until homogeneous.

The procedure was repeated wherein Vinyl Latices B and C were substituted for Vinyl Latex A.

The resulting coating compositions were applied to bleached kraft paper of about 85 g./m.², machine glazed on one side only using the air knife coating technique described hereinbefore.

For comparison various commercial resins were substituted for the various vinyl latices. The proprietary resins were as follows:

Name or designation     Composition
- AC 141 N _____ Polyvinyl alcohol.
- Acronal 500 D _____ Vinyl acetate: butyl acrylate: acrylic acid in wt. ratio of 48:48:2.
- Resyn 1103 _____ Vinyl acetate copolymer.
- DOW 630 _____ Styrene-butadiene copolymer.

The air knife applicational data is presented in Table I.

The pigment dispersion was made by stirring for about two hours in a slow paddle mixer a slurry of clay in water to which a small amount of wetting agent had been added. The slurry was rendered alkaline to prevent the occurrence of pigment shock during the subsequent addition of alkaline casein solutions.

The casein solution was made by adding, with gentle stirring, the preweighted amount of casein to water prewarmed at 60° C. After five minutes wetting, the caustic and ammonia solutions were added. These chemicals, solubilising aids or cutting agents as they are called, have to be added in order to obtain a suitable solution. (Ammonia in the mixture gives the advantage of a slightly reduced alkalinity of the finally coated paper after drying,

TABLE I.—APPLICATIONAL DATA

| Binder | Solids content, percent wt. | Viscosity Brookfield, 23° C., cps. | Angle airknife-paper, deg. | Air knife "pressure," mm. vp. | Distance air slot-paper, mm. | Wt. of coating, g./m.² |
|---|---|---|---|---|---|---|
| Vinyl latex A | 39.0 | 120 | 82 | 300 | 6.0 | 22 |
| Vinyl latex B | 39.0 | 150 | 82 | 350 | 6.0 | 20 |
| Vinyl latex C | 39.0 | 135 | 82 | 300 | 6.0 | 22 |
| P.V.A. AC 141 N | 35.0 | 170 | 82 | 300 | 6.0 | 20 |
| Acronal 500 D | 38.7 | 105 | 82 | 300 | 6.0 | 20 |
| Resyn 1103 | 39.5 | 105 | 72 | 500 | 6.0 | 22 |
| DOW 630 | 40.9 | 175 | 82 | 450 | 6.0 | 21 |

The papers coated with the starch/vinyl polymer latex binders and proprietary binders were tested using the tests hereinbefore described. The test results and evaluations are tabulated in Table II.

EXAMPLE II

The procedures of Example I were substantially repeated wherein the coating composition, consisted of (1) Vinyl Latex A (2) casein solution and (3) pigment dispersion on a weight ratio of 100:100:1000.

The Vinyl Latex A is described hereinbefore and the pigment dispersion and casein solution compositions are as follows:

which is often desired for printability purposes.) After addition of the cutting agents the mixture was stirred for 25 minutes before application.

The blending operation of the components was also carried out in a slow paddle mixer. The casein solution was slowly added to the pigment dispersion and subsequently the appropriate amount of latex was added.

The resulting coatings exhibited properties essentially identical to the properties exhibited by the compositions of Example I wherein the binder was Vinyl Latex A and starch.

Similar improved results were obtained when Vinyl Latex B or C 30 was substituted for Vinyl Latex A.

TABLE II

| Properties | Numerical rating for coating colours based on— | | | | | | |
|---|---|---|---|---|---|---|---|
| | Vinyl latex | | | AC 141 N | Acronal 500 D | Resyn 1103 | DOW 630 |
| | A[1] | B[1] | C[1] | | | | |
| Starch mix, initial viscosity | 7 | 7 | 8 | 7.5 | 5 | 7 | 9 |
| Starch mix, ageing | 8 | 7 | 7 | 8 | 3 | 7 | 8 |
| Printing penetration | 8 | 7.5 | 8 | 6 | 8 | 7 | 8 |
| Coating homogeneity | 8 | 7.5 | 7.5 | 7.5 | 7 | 7 | 8 |
| Density, bookprinting | 7 | 7.5 | 7.5 | 6 | 7 | 8 | 8 |
| Density, offset | 7 | 7.5 | 8 | 6 | 7 | 8 | 7.5 |
| Striking-in, after 5 secs | 7.5 | 8.5 | 8 | 5 | 7 | 9 | 8.5 |
| Striking-in, after 30 secs | 8 | 8.5 | 8.5 | 5 | 7 | 9 | 7.5 |
| Striking-in, after 60 secs | 8 | 7.5 | 9 | 5 | 7 | 8.5 | 7.5 |
| Dennison pick resistance | 8 | 8 | 8 | 4 | 7 | 8 | 8 |
| I.G.T. pick (bookprinting): | | | | | | | |
|   Oil N, falling pendulum | 2 | 2 | 3 | 0 | 3 | 6 | 4 |
|   Oil L, falling pendulum | 10 | 10 | 10 | 4 | 10 | 10 | 10 |
|   Oil L, spring drive-device, A | 7 | 7 | 9 | 0 | 8 | 10 | 10 |
|   Oil L, spring drive-device, M | 5 | 5 | 9 | 0 | 6 | 10 | 10 |
|   Oil L, spring drive-device, B | 3 | 3 | 6 | 0 | 4 | 6 | 4 |
| I.G.T. pick (offset): | | | | | | | |
|   Oil N, falling pendulum | 0 | 2 | 3 | 0 | 0 | 3 | 3 |
|   Oil L, falling pendulum | 10 | 10 | 10 | 4.5 | 10 | 10 | 10 |
|   Oil L, spring drive device, A | 6 | 8.5 | 10 | 0 | 7 | 10 | 8 |
|   Oil L, spring drive device, M | 4.5 | 6 | 9 | 0 | 3.5 | 9 | 7 |
|   Oil L, spring drive device, B | 3 | 5 | 7.5 | 4 | 4 | 7.5 | 6 |
| Wet rub resistance | 7.5 | 7 | 8.5 | 4 | 8 | 8.5 | 9 |
| Total | 142.5 | 150 | 172.5 | 81.5 | 136.5 | 176.5 | 169 |

[1] In combination with starch.

Pigment dispersion:
- China Clay S.P.S. _____ g__ 2000
- Calgon "S" (10% wt.) _____ cc__ 60
- Water _____ cc__ 890
- NaOH (10% wt.) _____ cc__ 50
- NH₄OH (25% wt.) _____ cc__ 6
- Nopco NDW (defoamer) _____ cc__ 4

Casein solution:
- Casein, Argentine, 30 mesh _____ g__ 100
- Water _____ g__ 410
- NaOH (10% wt.) _____ cc__ 30
- NH₄OH (25% wt.) _____ cc__ 12.5

EXAMPLE III

The procedures of Examples I and II were substantially repeated wherein the vinyl latex was a terpolymer of (1) vinyl acetate, (2) vinyl esters of alpha-branched, saturated, aliphatic monocarboxylic acids containing 9 to 11 carbon atoms in the acid portion and (3) acrylic acid in the weight ratio of 65:35:1. Similar improved properties were exhibited by the paper coatings.

I claim as my invention:

1. A process for coating paper which comprises first applying to the surface of said paper an aqueous dispersion comprising (A) 100 parts by weight of pigment and (B) from 10 to 30 parts by weight of a binder comprising (1) from 20 to 90 parts by weight of a material selected from the group consisting of starch and casein and (2) from 10 to 80 parts by weight of a vinyl terpolymer latex comprising from 20 to 65% by weight vinyl acetate, from 35 to 80% by weight of vinyl esters of alpha-branched, saturated aliphatic monocarboxylic acids containing from 9 to 19 carbon atoms in the acid portion and from 1 to 3% by weight of acrylic acid, and then drying said coated paper.

2. A process as in claim 1 wherein the pigment is clay.

3. A process as in claim 1 wherein the pigment to binder weight ratio is between 100:20 and 100:10.

4. A process as in claim 1 wherein the monocarboxylic acids contain from 9 to 11 carbon atoms.

5. A process as in claim 1 wherein the aqueous dispersion contains from 20 to 75% by weight solids.

References Cited

UNITED STATES PATENTS

| | | | |
|---|---|---|---|
| 2,444,396 | 6/1948 | Collins et al. | 260—29.6 |
| 2,611,762 | 9/1952 | Luce | 260—78.5 |
| 2,824,023 | 2/1958 | Banigan | 260—17.4 X |
| 2,914,495 | 11/1959 | Gordon et al. | 260—17.4 |
| 2,956,973 | 10/1960 | Holdsworth | 260—17.4 X |
| 3,001,957 | 9/1961 | Kray et al. | 117—165 X |
| 3,010,929 | 11/1961 | Jones | 260—17.4 X |
| 3,186,974 | 6/1965 | Verberg | 260—85.7 |
| 3,294,727 | 12/1966 | Grommers et al. | 260—29.6 |
| 3,342,765 | 9/1967 | Oosterhof et al. | |
| 3,370,031 | 2/1963 | Grommers et al. | 260—29.6 |

WILLIAM D. MARTIN, Primary Examiner

M. LUSIGNAN, Assistant Examiner

U.S. Cl. X.R.

117—156; 260—17.4